US006931118B2

(12) United States Patent
McKinley, Jr. et al.

(10) Patent No.: US 6,931,118 B2
(45) Date of Patent: Aug. 16, 2005

(54) APPLICATION-SPECIFIC SUBNET FOR ENHANCED CALL PROCESSING

(75) Inventors: James W. McKinley, Jr., Bowie, MD (US); Alexander I. McAllister, Mercerberg, PA (US); Rita N. Yadav, Ellicott City, MD (US); John L. Eidsness, Bowie, MD (US)

(73) Assignee: Verizon Federal Inc., Arlington, VA (US)

( * ) Notice: Subject to any disclaimer, the term of this patent is extended or adjusted under 35 U.S.C. 154(b) by 507 days.

(21) Appl. No.: 09/866,095

(22) Filed: May 24, 2001

(65) Prior Publication Data

US 2002/0176560 A1 Nov. 28, 2002

(51) Int. Cl.$^7$ .......................... H04M 3/42; H04M 3/58; H04M 7/00
(52) U.S. Cl. ............................ 379/220.01; 379/201.12; 379/212.01; 379/221.08
(58) Field of Search .................... 379/201.01, 201.12, 379/212.01, 219, 220.01, 221.08, 230, 265.01, 265.02, 265.09, 265.11, 266.1

(56) References Cited

U.S. PATENT DOCUMENTS

| | | | | |
|---|---|---|---|---|
| 5,469,504 A | * | 11/1995 | Blaha | 379/265.11 |
| 5,572,583 A | | 11/1996 | Wheeler, Jr. et al. | 379/221.09 |
| 5,583,564 A | | 12/1996 | Rao et al. | 348/14.01 |
| 5,590,186 A | * | 12/1996 | Liao et al. | 379/211.02 |
| 5,987,118 A | * | 11/1999 | Dickerman et al. | 379/265.01 |
| 5,991,364 A | | 11/1999 | McAllister et al. | 379/88.01 |
| 6,058,313 A | * | 5/2000 | Slutsman et al. | 455/445 |
| 6,072,864 A | * | 6/2000 | Shtivelman et al. | 379/211.01 |
| 6,442,242 B1 | * | 8/2002 | McAllister et al. | 379/67.1 |
| 6,526,138 B1 | * | 2/2003 | Ibezim et al. | 379/221.08 |

* cited by examiner

*Primary Examiner*—Harry S. Hong
(74) *Attorney, Agent, or Firm*—Leonard C. Suchyta, Esq.; Joel Wall, Esq.; Rader, Fishman & Grauer PLLC

(57) ABSTRACT

A method of creating an application-based subnet for enhanced telephony call processing includes the steps of determining during the processing of a call that the call may require additional call processing services available at a second node located within an application-specific subnet, and transferring the call and call control to the application-specific subnet for further call processing.

3 Claims, 2 Drawing Sheets

APPLICATION-SPECIFIC SUBNET FOR ENHANCED CALL PROCESSING

CROSS-REFERENCE TO RELATED APPLICATIONS

This application is related to the subject matter disclosed in the commonly owned and currently pending U.S. patent application entitled "Networked Voice-Activated Dialing and Call Completion System" and identified by Ser. No. 09/680,620 filed Oct. 6, 2000.

TECHNICAL FIELD

The present invention is related in general to enhanced and distributed call-processing services, and in particular, to a sub-network designed to provide information that assists a call to be routed to a destination.

BACKGROUND

Typical telecommunication systems include a switching system such as a central office switching system. In its simplest form, the central office switching system provides for terminating connections that connect to a subscriber's premises in a Customer Premise Equipment (CPE) such as a Private Branch Exchange (PBX) or a telephone handset. Typically, such central office switching systems have been configured to contain a centralized point of control of the telephone call. Typically, a Switching Point Control (SPC) type switch controlled the originating office equipment, where a call is received. The SPC thereafter determines an appropriate method of translating any dialed number to determine a terminating point. The central office switching system is also coupled to other network elements such as tandem switching systems that allow connection to other central office switches via long-haul trunk networks. In many cases, the central office switching system is also coupled to Intelligent Network (IN) elements such as the Service Control Point (SCP) or the Intelligent Peripheral (IP) to obtain call routing information or to provide a more elaborate subscriber interaction.

Recently, with the advent of the Internet and other interconnected public and private data networks, the traditional telephone networks are being integrated with computer networks to provide voice traffic over computers as well as data traffic over voice networks. Another recent trend is that companies and other organizations have been creating own networks that could be integrated or interconnected with the public networks. Such corporate or organizational network may maintain its own directory and information to identify entities or persons within its network. Thus, that a corporate-managed network may contain information that could be useful to an entity that wishes to connect or communicate with an entity within the corporate or other private network. But there is no presently available system that provides for a call to be partially processed at a first node and thereafter be processed at a second node to complete the call. Therefore, there is a need for such as system and method.

SUMMARY

A method of creating an application-based subnet for enhanced telephony call processing includes the steps of determining during the processing of a call that the call may require additional call processing services available at a second node located within an application specific subnet, and transferring the call and call control to the application-specific subnet for further call processing.

In an embodiment, two networks, one public telephone network, and a private corporate network are envisioned. The public telephone network provides traditional telephony call processing services. The private corporate network may provide services such as directory assistance for the corporation's employees, voice activated dialing for the corporate employee directory, voice verification to enter secure areas within the corporate network, etc.

When a calling party makes a telephone call at the public telephone network, the telephone network may attempt to complete the call in a traditional way. But when the telephone network determines that additional call processing services are required to complete the call further, the services such as those provided by a corporate subnet, the call is transferred to the corporate subnet along with any call related information, such as the identity of the calling party, and the like.

BRIEF DESCRIPTION OF THE DRAWINGS

These and other features, objects and advantages can be more readily understood from the following detailed description and the accompanying drawings, wherein.

DETAILED DESCRIPTION

A typical telecommunication network, also known as the Public Switched Telephone Network (PSTN) contains any combination of network elements such as switching systems (e.g., end office, tandem, and terminating office switches), Intelligent Network elements such as Service Control Point (SCP), Intelligent Peripheral (IP), Signaling elements such as Service Switching Point (SSP), Service Transfer Points (STP), signal transfer points (SSP), and others such as Interactive Voice Response (IVR), and Voice Activated Dialers (VAD). The network elements such as switching systems, SCP, SSP, STP, IP, and IVR are known to persons of ordinary skill in the art. The VAD is described in the related commonly owned and currently pending application Ser. No. 09/680,620 filed Oct. 6, 2000, the disclosure of which application is hereby incorporated by reference in its entirety.

Telecommunication networks may also be configured to contain hybrid networks including wireless networks, interconnected public computer networks known as the Internet, private or public packet or circuit-switched networks, satellite, cable networks, local, wide or metropolitan area networks, and any other method used to accomplish voice, video or data communication between a transmitting entity and a receiving entity.

Figure 1:
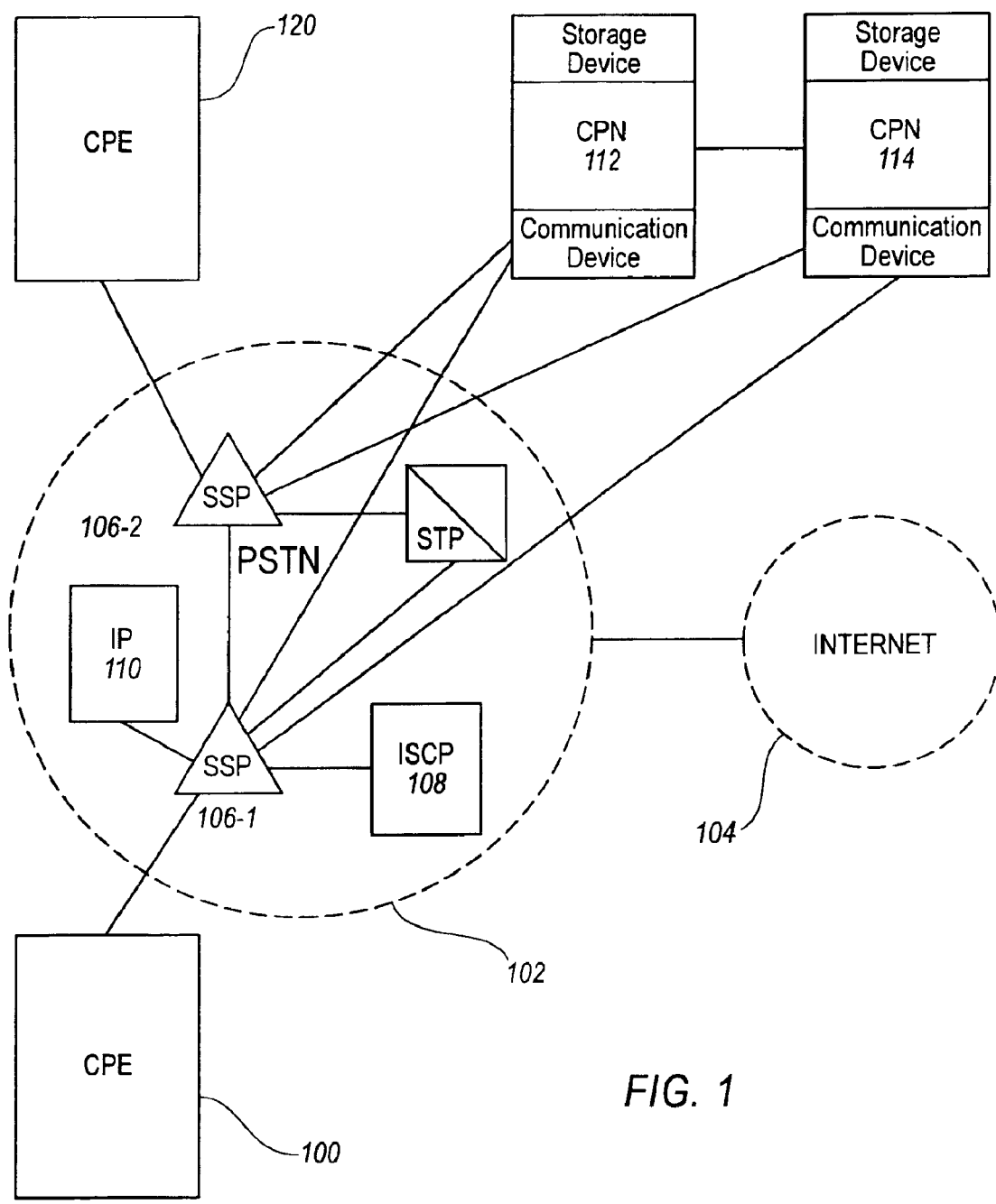
FIG. 1 shows an illustrative architecture of a telecommunication system with different network nodes.

Referring now to FIG. 1, an illustrative architecture of a telecommunication network in which the principles of the present invention may be practiced includes a Customer Premise Equipment (CPE) device such as a telephone hand set 100 is coupled to a second CPE device 120 via a telecommunication network comprising the PSTN (102). The PSTN 102 is assumed to include traditional network of switching systems that carry voice and data, as well as signaling networks such as the SS7 networks. The PSTN 102 is in turn connected to other networks such as the Internet 104 and wireless networks (not shown) or other networks such as private networks (not shown). It should be noted that though the CPE is shown as directly connected to the SSP in the FIG. 1, alternative embodiments include a Private Branch Exchange (PBX) (not shown) or other intermediate method of connecting the hand set to the PSTN. Furthermore, in alternative embodiments, the handset could be any transceiver that is configured to transmit and receive information using voice, data, video, or other method or a combination of these methods.

Also shown in FIG. 1 are Intelligent Network elements such as a Service Switching Point (SSP) 106-1 and 106-2. An Intelligent Service Control Point (ISCP) 108, and an IP 110 are coupled to the SSP 106-1 via Transaction Capabilities Application Part (TCAP) and 1129+ respectively. Alternative embodiments may use equivalent network protocols. Without loss of generality, the SSP 106-2 is shown with no adjunct elements such as the ISCP or the IP coupled to it. Additional elements in the illustrative architecture include two call processing nodes (CPN) 112 and 114, which are shown as coupled to the PSTN 102 directly or via the Internet 104. The CPN 114 may be, as indicated in FIG. 1, be coupled to the Internet 104 via a private network, which may use a firewall or other device (not shown) to provide a selective access to the CPN 114 for an entity outside the private network.

The CPN 112 or 114 may be a programmed general purpose computer including a processor such as the Pentium III® or the RS/6000® microprocessor, a storage device such as disk drive, memory device such as semiconductor memory and a communication device such as a network card. The CPN 112 or 114 could also include an operating system program such as UNIX™, Linux, or Windows-NT™. The processor is configured to execute instructions stored in the storage device or in memory, which instructions may be written in a high level language such as C, C++, Java or other similar language. The CPN 112 or 114 could also be configured to execute programs such as the Oracle Relational Database Management System (not shown).

The CPN 112 and 114 are coupled to the respective networks via the network card establishing a network connection using a standard method such as the Transmission Control Protocol/Internet Protocol (TCP/IP). In alternative embodiments, the CPN 112 or 114 may also be configured to function as a web server, thus interacting with requests from the Internet in the Hyper Text Transfer Protocol (HTTP) format.

As described in the related application, the CPN 112 or 114 could also be configured to perform special services such as voice recognition, voice verification and voice identification. The CPN 112 or 114 could be equipped with specialized interface devices to receive appropriate types of data in order to perform these special services.

These special services can be performed by suitably programming the CPN 112 or 114 with software programs marketed by vendors such as Nuance Communications, Inc. of Menlo Park, Calif. As a voice recognition system the CPN 112 or 114 may be configured to use a method such as Hidden Markov Model (HMM) to recognize phonemes in a user's spoken voice and return a matched word, which may be further processe by the CPN 112 or 114 to match a name or a command to execute. As a voice identification system, the CPN 112 or 114 may be configured to receive a user's spoken utterance and identify by matching against known (and stored) samples to determine if the user is indeed the person he or she claims to be. As a voice verification system, the CPN 112 or 114 may be configured to verify a user's access by identifying or recognizing the user's voice and determining whether the user has permission to access certain services provided by the CPN 112 or 114.

In one embodiment, the CPNs 112 and 114 are configured to form a sub-network along with other CPNs. Thus, in an embodiment, the subnet could be application specific, i.e., the CPNs are configured to perform a similar function or application, for example, as voice activated dialer (VAD) nodes. In another embodiment, each CPN could be dedicated to a special application or function, and together all the CPNs in a subnet may perform diverse functions required to process a call.

Suitably, the CPNs 112 and 114 are designated network addresses or suffixes indicative of the type of function a particular CPN provides. For example, a CPN that is configured to function as a VAD may be designated a network address suffix such as ".vox", a CPN configured to perform white or yellow pages or other directory services could be designated an address suffix ".dir", a suffix ".fin" for financial services, a suffix ".med" for medical services, and other such specialized functions.

In alternative embodiments, the particular function a CPN provides may include VAD services such as those described in the related application, where a called party name is matched to a called party station or number. In other embodiments, the CPN may provide medical, financial or other information that could assist the calling party to complete the call.

In one aspect, the above-described architecture achieves enhanced call processing for certain telephony applications by partially processing call at a first CPN and thereafter completing the call at a different CPN. This could, for example, facilitate complex call routing in cases where routing information cannot be determined when the call is made, or in cases where routing information may change dynamically during a call. Call processing is advantageously delegated to a particular CPN, for instance, to determine information available within a private network not visible to an outside network.

In another aspect, the present method includes a method of integrating disparate telecommunication networks such as the PSTN with wireless, cable, satellite, the Internet or other types of networks. Since these networks are different from each other, call information and call control could be transferred to a different network, which could thereafter process the call to completion. The presently invented method includes CPNs 112 and/or 114 programmed to execute instructions to direct respective processors to perform the steps of the method described in the following.

Figure 2:
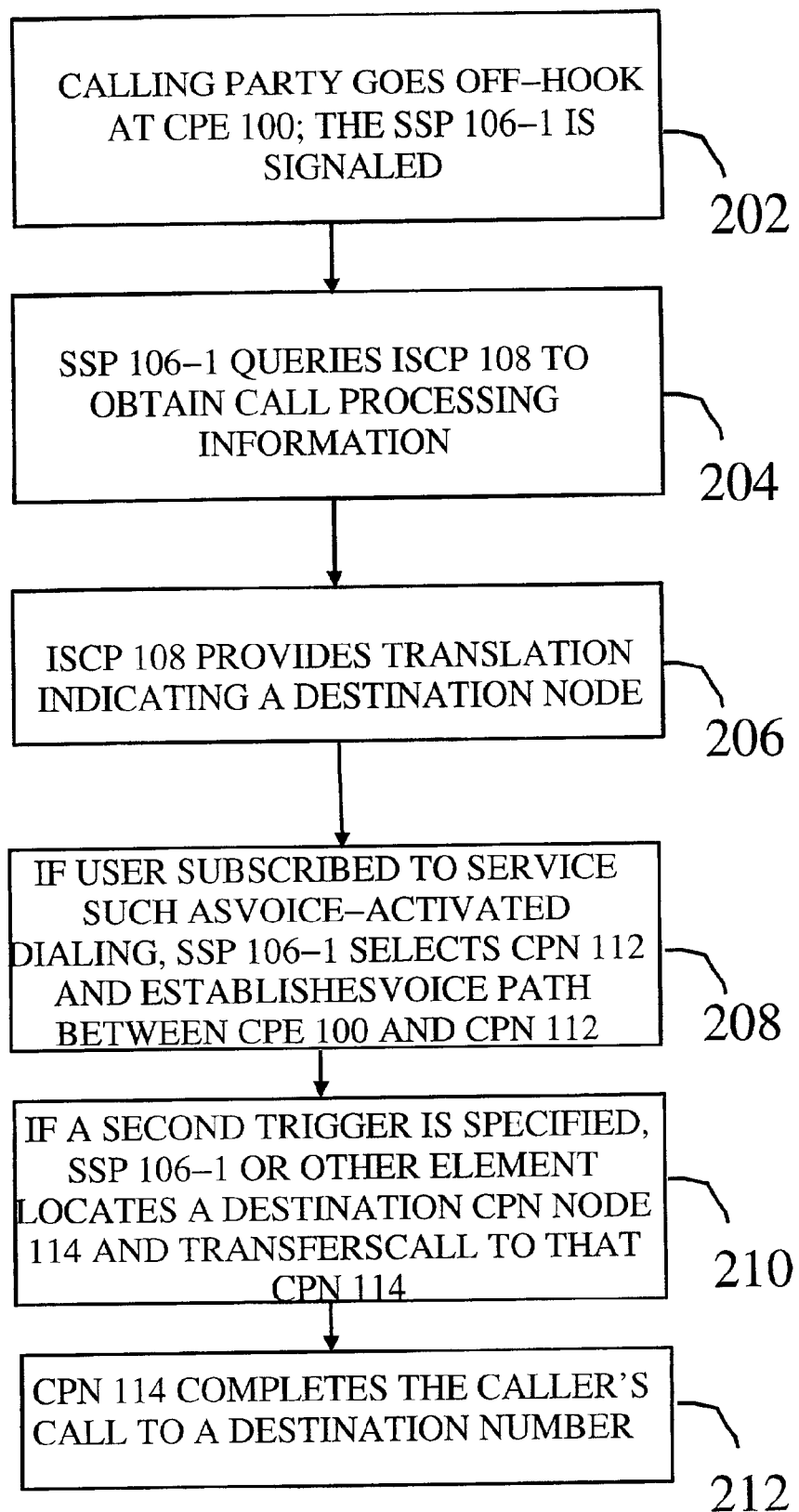
FIG. 2 shows a flow-chart of a typical call partially processed at a first node and further at a second node in accordance with the principles of the present invention.

Referring now to FIG. 2, a call is described to illustrate the steps included in the presently invented method. It should be, however, noted that the invention should not be limited to the described embodiment only.

Initially, a calling party (not shown) goes off hook at the CPE 100, which signals the SSP 106-1 (step 200). Assume that the SSP 106-1 is provisioned with an originating trigger such as an Off-Hook Trigger for the CPE 100. When the SSP 106-1 receives an Off-Hook signal from—or detects an off-hook condition at—the CPE 100, in an embodiment, the SSP 106-1 may query the ISCP 108 to determine how to process the call (step 202). This is traditionally the manner in which a call is processed in an Intelligent Network such as one described in Rao, et al. Typically, a call progress record (CPR) associated with the Off-Hook Trigger for the CPE 100 and stored in the ISCP 108 indicates how the interaction between the SSP 106-1 and the ISCP 108 may take place. First, the SSP 106-1 sends a data packet in the TCAP format to the ISCP 108, whereupon an interactive dialog ensues in accordance with the CPR. The ISCP 108 may request the SSP 106-1 to provide information depending on any of the several possible conditions described in the CPR. Upon receiving the information, the ISCP 108 provides an appropriate translation (destination number or DN) to which the CPE 100 may be routed.

Assume further that the caller has subscribed to voice-activated dialing service. After determining the user's subscription status, the SSP 106-1 selects an appropriate CPN to perform voice activated dialing for the calling party and establishes a voice path between the CPE 100 and the selected CPN, for example, CPN 112 (step 206). It is assumed that the CPN 112 is configured as a VAD as described in the related application. The CPN 112 thereafter plays a prompt to the calling party. In response, the calling party speaks the name of a called party with which the calling party wishes to communicate. The CPN 112 recognizes the speech and translates the recognized speech to a calling party station's network address.

Suppose now that a second trigger is specified in the SSP-1, ISCP 108, or the CPN 112 for the calling party station. This trigger could be specified in the SSP 106-1, which may initiate a query to the ISCP 108. This trigger is different from the first trigger in that the second trigger may be a mid-call trigger or a call-terminating trigger. Though the second trigger could be similar to the switch-based or ISCP-based triggers such as the Off-Hook trigger, the second trigger may also be an indication received from the CPN 112, which may have determined that the call could not be completed with certainty. For example, the CPN 112 may determine that only transferring the call to a node—located in a different subnet such as a corporate subnet—the CPN 112 could complete the call.

The CPN 112 may indicate its inability to complete the call to the ISCP 108. The ISCP 108 may, for instance, indicate calls directed to the called party station should be transferred to CPN 114, which could be a part of a different network, such as a private network. This private network could be a different network such as a packet-switched network (e.g., the Internet), a cable network, wireless network, or a satellite network.

Thus, the above example describes a scenario where the second trigger may be useful could be a determination by the CPN 112 that the call requires translation information that is resident in a different node, e.g., CPN 114. Alternative examples could be the need for a speaker identification or speaker voice verification services, which could be offered by CPN 114.

Responsive to the second trigger, the SSP 106-1 transfers the call to the CPN 114 (step 208). In one embodiment, the SSP 106-1 may establish a path between the CPE 100 and the CPN 114 as if the call were terminated at the CPN 114, thereby transferring control of further processing to the CPN 114. In another embodiment, the SSP 106-1 may transfer the call to a second SSP 106-2 whereupon a voice path is established between the CPN 114. The SSP 106-1 may use any signaling method such as in-band signaling, or out-of-band signaling to transmit signaling and call control information to the CPN 114. In one embodiment, the SSP 106-1 also transmits additional information to CPN 114. This additional information may include the calling party's Automatic Number Identification (ANI), speech sample, retina scan, and other biometric information.

It should be noted that the CPN 114 could be located in a different network than the PSTN to which the CPN 112 may be directly coupled. For example, as stated above, the CPN 114 could be a part of a private or corporate network. Further, the corporate or private network could require proper authentication or a password to access the CPN 114. Further, there could be several similarly designed service nodes such as the CPN 114 from which the PSTN may choose a particular node.

Thus, according to the method described herein, a second and a possibly third CPN will be determinative of whether the caller's call could be processed completely. The calling party may be required at various CPNs and at various instances, to provide additional inputs in the form of identification, authentication, authorization (e.g., password), or verification of the request to communicate with the called party. Thus, a distributed call processing scenario is possible according to the principles described herein.

In the presently described embodiment, for sake of simplicity, the second CPN 114 provides adequate information and completes the caller's call (step 210). The calling party may be able to communicate—one or two-way—with the called party via voice, voicemail, text, video, paging or other method by sending an appropriately formatted message.

The foregoing describes an enhanced and distributed call processing system wherein a call is processed at multiple call processing nodes which provide specialized or dedicated services, and which nodes could be owned or controlled by entities other than the central office telephone service provider. Billing for the call or portions of the call could be accomplished by a plurality of networks separately, based on the particular services used by the calling party, or any subscription made by the called party. Persons skilled in the art may make several modifications or rearrangements to the described embodiments without significantly departing from the spirit and scope of the inventive principles. All such departures should properly be construed to be included within the scope of the appended claims.

What is claimed is:

1. A communication system comprising:
    a first central office switching system of a first communication network;
    a first call processing node of at least one other communication network, said first call processing node comprising:
    a first processor and first memory device coupled to the first processor, the first memory device configured to store a first set of instructions to direct the first processor to act in accordance with the first set of instructions; and
    a communication device to establish a communication path between the first call processing node and the first central office switching system, wherein when the first central office switching system receives a call from a calling party, upon determining need for enhanced call processing via voice recognition, voice verification, or voice identification, the first central office switching system selects one of a plurality of available call processing nodes within said at least one other communication network, said selection being determined by the type of the call, transfers the call, and caller information to the selected call processing node, whereupon the first set of instructions direct the first call processing node to determine routing information and complete the call.

2. The communication system as in claim 1, further comprising a second call processing node, said second call processing node comprising second processor and second memory device configured to store second set of instructions to direct the second processor to act in accordance with the second set of instructions.

3. A method of integrating PSTN with a second network comprising the steps of:

receiving a call from a calling party at a central office switching system comprised in the PSTN;

connecting the call from the PSTN to a first call processing node for processing based on a first trigger;

receiving a second trigger at the PSTN;

determining that the call requires enhanced call processing via voice recognition, voice verification, or voice identification services available at a second call processing node attached to a second network based on the second trigger; and transferring the call and call information from the first call processing node to the second call processing node attached to the second network to provide additional routing information for completing the call.

\* \* \* \* \*